United States Patent [19]

Ogura et al.

[11] Patent Number: 5,124,744

[45] Date of Patent: Jun. 23, 1992

[54] ORIGINAL SCANNING APPARATUS AND IMAGE FORMING APPARATUS

[75] Inventors: Masahiko Ogura, Yokohama; Kazuhiro Ikemori, Kawasaki; Tatsuyuki Miura, Yokohama, all of Japan

[73] Assignee: Kabushiki Kaisha Toshiba, Kawasaki, Japan

[21] Appl. No.: 570,845

[22] Filed: Aug. 22, 1990

[30] Foreign Application Priority Data

Aug. 30, 1989 [JP] Japan ................. 1-221592

[51] Int. Cl.$^5$ ..................... G03B 27/52; G03B 27/50
[52] U.S. Cl. .......................... 355/51; 355/56
[58] Field of Search ............ 355/55, 56, 235, 51, 355/236; 318/685, 696; 358/296, 300; 346/160

[56] References Cited

U.S. PATENT DOCUMENTS

| 3,877,807 | 4/1975 | Kurita | 355/235 |
| 4,254,371 | 3/1981 | Scholten | 318/685 |
| 4,586,808 | 5/1986 | Tanimoto et al. | 355/235 |
| 4,748,555 | 5/1988 | Miyake et al. | 318/567 X |
| 4,870,448 | 9/1989 | Miyake et al. | 355/235 |

FOREIGN PATENT DOCUMENTS 3343688 6/1984 Fed. Rep. of Germany .
3415298 10/1984 Fed. Rep. of Germany .

Primary Examiner—L. T. Hix
Assistant Examiner—D. Rutledge
Attorney, Agent, or Firm—Foley & Lardner

[57] ABSTRACT

An image forming apparatus employs a control means for controlling a driving means such that the current supplied to the driving means is varied between the interval from the end of the acceleration of a scanning means in the advancing direction to the start of the returning of the scanning means and the interval from the start of the returning of the scanning means to the end of the acceleration of the scanning means in the advancing direction. Due to the employment of this control means, a large torque is produced by a moving means for the scanning means during the interval from the start of the returning of the scanning means to the end of the acceleration of the scanning means in the advancing direction. Accordingly, vibrations are suppressed at the end of the returning movement of the scanning means. Since a scan motor is prevented from becoming out of step and since the stator and rotor are prevented from being shifted in position with reference to each other, it is possible to produce an image free from a blur.

10 Claims, 6 Drawing Sheets

ORIGINAL SCANNING APPARATUS AND IMAGE FORMING APPARATUS

BACKGROUND OF THE INVENTION

1. Field of the Invention

The present invention relates to an original scanning apparatus for optically reading an original placed on an original table in accordance with the movement of an optical system. The present invention also relates to an image forming apparatus incorporating the original scanning apparatus.

2. Description of the Related Art

In general, an image forming apparatus, e.g., an electronic copying machine is provided with a scanner, i.e., an original scanning apparatus, for optically reading the image on an original placed on an original table. The scanner comprises an exposure lamp for emitting light illuminating the original. The scanner also comprises an optical system including mirrors which guide the light reflected by the original to a photosensitive drum. With the optical system moved along the lower side of the original table, the image on the original is read.

In the scanner incorporating a stepping motor so as to drive the optical system, the optical system is driven slowly when it is advanced for scanning or reading the image on the original, and is driven fast when it is returned to the initial position. When the optical system is being returned, large torque is required for the acceleration or deceleration of the optical system. Therefore, a constant current circuit is employed to drive the stepping motor. When the optical system is being advanced for scanning, small torque is sufficient. In this case, therefore, the constant current circuit is so set as to produce a small amount of current. Thus, the motor and the constant current circuit are prevented from producing much heat, to thereby enhance the efficiency of the scanner.

In a conventional image forming apparatus, the optical system of a scanner is quickly decelerated at the end of the returning movement so as to stop the optical system at the initial position. In some cases, the optical system has to be accelerated for the next scanning operation, immediately after it is stopped at the initial position. In such cases, the optical system is likely to vibrate. This vibration may adversely affect the image formation performed when the optical system is being accelerated. More specifically, the stepping motor for driving the optical system may become out of step, or its rotor and stator may shift in position with reference to each other, causing dislocation of the scanning optical system. As a result, an image produced by the image forming apparatus may be blurred.

SUMMARY OF THE INVENTION

Accordingly, an object of the present invention is to provide an original scanning apparatus whose means e.g., a stepping motor for moving a scanning optical system is always in step and which is free from dislocation of the scanning optical system. Another object of the present invention is to provide an image forming apparatus incorporating the original scanning device.

To achieve the first object, the present invention provides an original scanning apparatus which comprises: means for scanning an original placed on an original table; means for moving to advance and retreat the scanning means; means for driving the moving means for the scanning means; and means for controlling the driving means such that the amount of current supplied to the moving means for the scanning means is varied between the interval from the end of the acceleration of the scanning means in an advancing direction to the start of the retreating of the scanning means and the interval from the start of the retreating of the scanning means to the end of the acceleration of the scanning means in the advancing direction.

The present invention further provides an image-forming apparatus which employs image forming means for permitting a document image obtained by the above scanning means to be formed on a material, such as a paper sheet.

In the present invention, the scanning means-moving means (e.g., a stepping motor) provides large torque during the interval from the start of the retreating of the scanning means to the end of the acceleration of the scanning means in the advancing direction. Therefore, vibration can be suppressed while the scanning means being advanced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

There will now be described an embodiment of the present invention with reference to the accompanying drawings.

Figure 1:
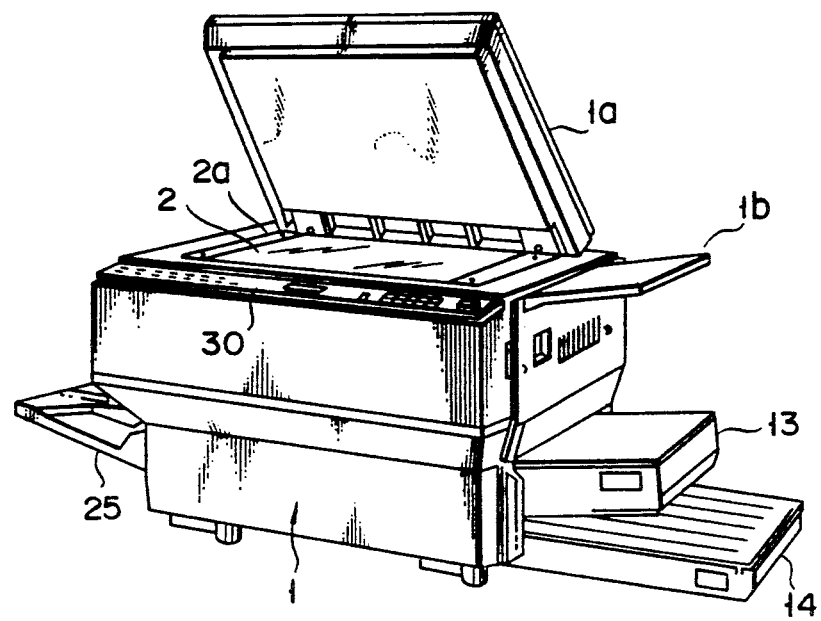
FIG. 1 is a perspective view showing an electronic copying apparatus.
Figure 2:
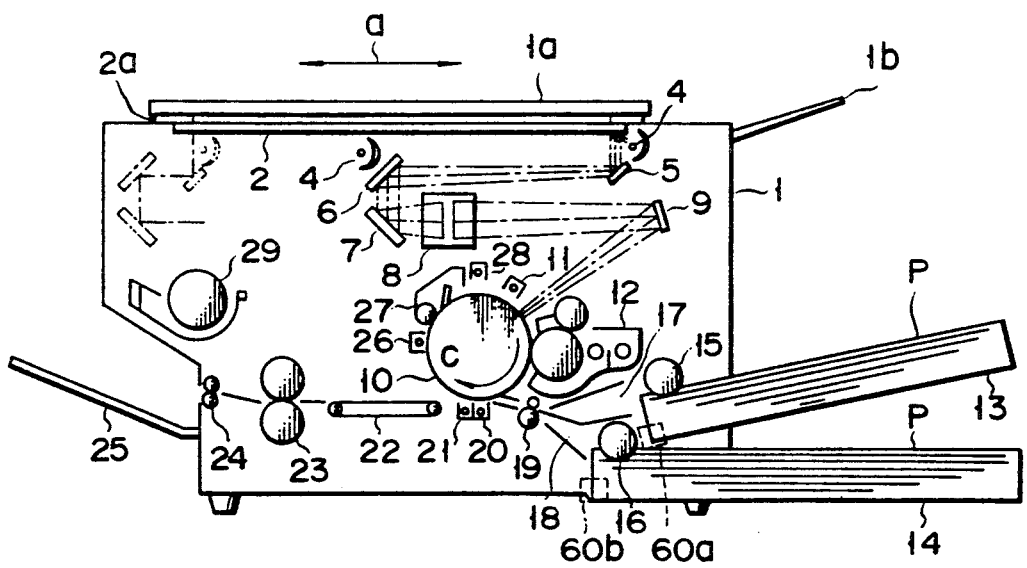
FIG. 2 is a sectional view showing the construction on one side of the electronic copying apparatus of FIG. 1.

FIGS. 1 and 2 are a perspective view and a sectional side view, respectively, both schematically showing an electronic copying apparatus, which is an example of an image forming apparatus according to the present invention. Referring to FIGS. 1 and 2, an original table 2, which is formed of transparent glass and supports an original placed thereon, is fixed to the upper face of the main body 1 of the electronic copying machine. The original table 2 has a fixed scale 2a, with reference to which the original is placed on the original table 2. An original cover 1a, which can be opened or closed, and a work table 1b are located in the vicinity of the original table 2. When an optical system, made up of an exposure lamp 4 and mirrors 5-7, is advanced or retreated along the lower side of the original table 2 in the directions indicated by arrow a in FIG. 2, the original placed on the original table 2 is exposed to light and is thus scanned. Mirrors 6 and 7 are moved at the speed which is ½ of the moving speed of mirror 5, to thereby permit the optical path to have a certain length. The light emitted from the exposure lamp 4 and reflected by the original is first reflected by mirrors 5, 6 and 7, then passes through a magnification varying lens block 8, and is finally reflected by a mirror 8 to a photosensitive drum 10. In this manner, an image on the original is focused on the photosensitive drum 10.

The photosensitive drum 10 is rotated in the direction indicated by arrow c in FIG. 2. When the photosensitive drum 10 begins to rotate, its surface is first charged by a discharger 11. Then, an electrostatic latent image is formed on the photosensitive drum 10 by slit exposure. The electrostatic latent image is visualized as a toner image when toner is attached to it by a developer 12.

In the meantime, a copying paper P, i.e., a material onto which an image is transferred, is fed by means of an upper or a lower paper feed cassette 13 or 14 one by one by means of a feed roller 15 or 16. The paper P taken out of one of the paper feed cassettes 13 and 14 is guided to a pair of regist rollers 19 via a paper guide passage 17 or 18. The register roller pair 19 in turn guides the paper P to an image transfer section. The paper feed cassettes 13 and 14 are removably provided at the lower portion on the right hand side of the main body 1. Any one of the paper feed cassettes 13 and 14 can be selected by operating the operation panel to be mentioned later. The size of the papers contained in the paper feed cassette 13 can be detected by a cassette size sensing switch 60a; likewise, the size of the papers contained in the paper feed cassette 14 can be sensed by a cassette size sensing switch 60b. Each of the cassette size sensing switches is comprised of a plurality of microswitches which are selectively turned on and off when each of the cassettes of different sizes is loaded.

The paper P fed to the image transfer section is brought into contact with the surface of the photosensitive drum 10 at the portion of a transfer charger 20 so that the toner image on the photosensitive drum 10 is transferred from the photosensitive drum 10 to the paper P by the action of the charger 20. The image-transferred paper P is separated from the photosensitive drum 10 electrostatically by a separating charger 21 and is carried by a paper carrying belt 22 to a pair of fixing rollers 23 which are provided at the end of the belt 22. When the paper P passes through the paired fixing rollers 23, the transferred image is fixed to the paper P. The paper P subjected to fixing passes a pair of paper discharge rollers 24, whereby the paper is discharged onto an outlet tray 25 located outside of the main body 1. After the image transfer is completed the photosensitive drum 10 is discharged by a discharger 26, and then the residual toner is removed from the surface of the photosensitive drum 10 by a cleaner 27. Further, the image remaining on the photosensitive drum 10 is erased by a discharge lamp 28, thereby bringing the photosensitive drum 10 into the initial state. A cooling fan 29 is provided for preventing an excessive rise in the temperature within the main body 1.

Figure 3:
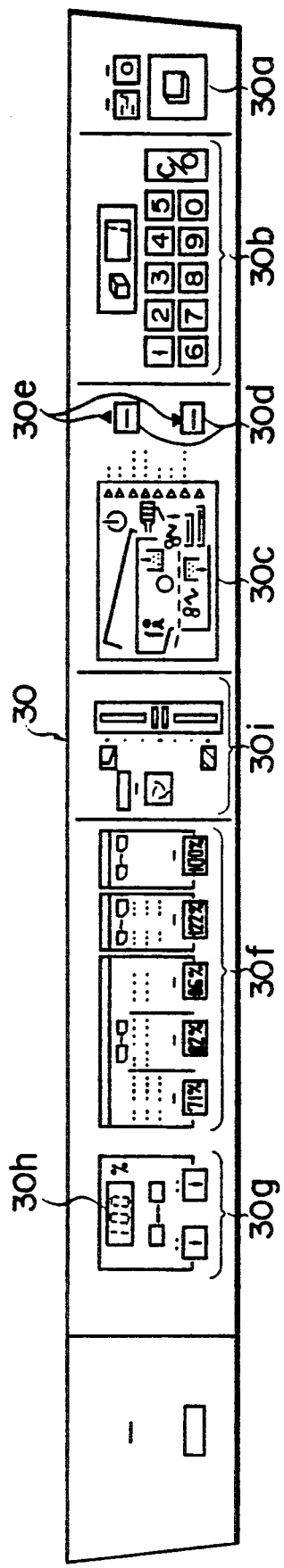
FIG. 3 is a plan view showing an operation panel.

FIG. 3 is a plan view of an operation panel 30 provided for the main body 1. In FIG. 3, reference symbol 30a denotes a copy key for instructing a start of a copying operation; 30b, a ten-key pad for inputting a numerical value such as the number of copies to make; 30c, a display for displaying the operating condition of each section and the occurrence of jamming of the paper; 30d, a cassette select key for selecting one of the upper and lower paper feed cassettes 13 and 14; 30e, a cassette display for displaying the paper feed cassette selected by the cassette select key 30d; 30f, magnification changing keys for setting the enlarging and reducing magnification of a copy within the predetermined relationships; 30g, zoom keys for continuously setting the enlarging and reducing magnification of a copy; 30h, a magnification display for displaying the magnification set by the operation of the keys; and 30i, copy density setting keys for selecting the density in which an original image is to be copied.

Figure 4:
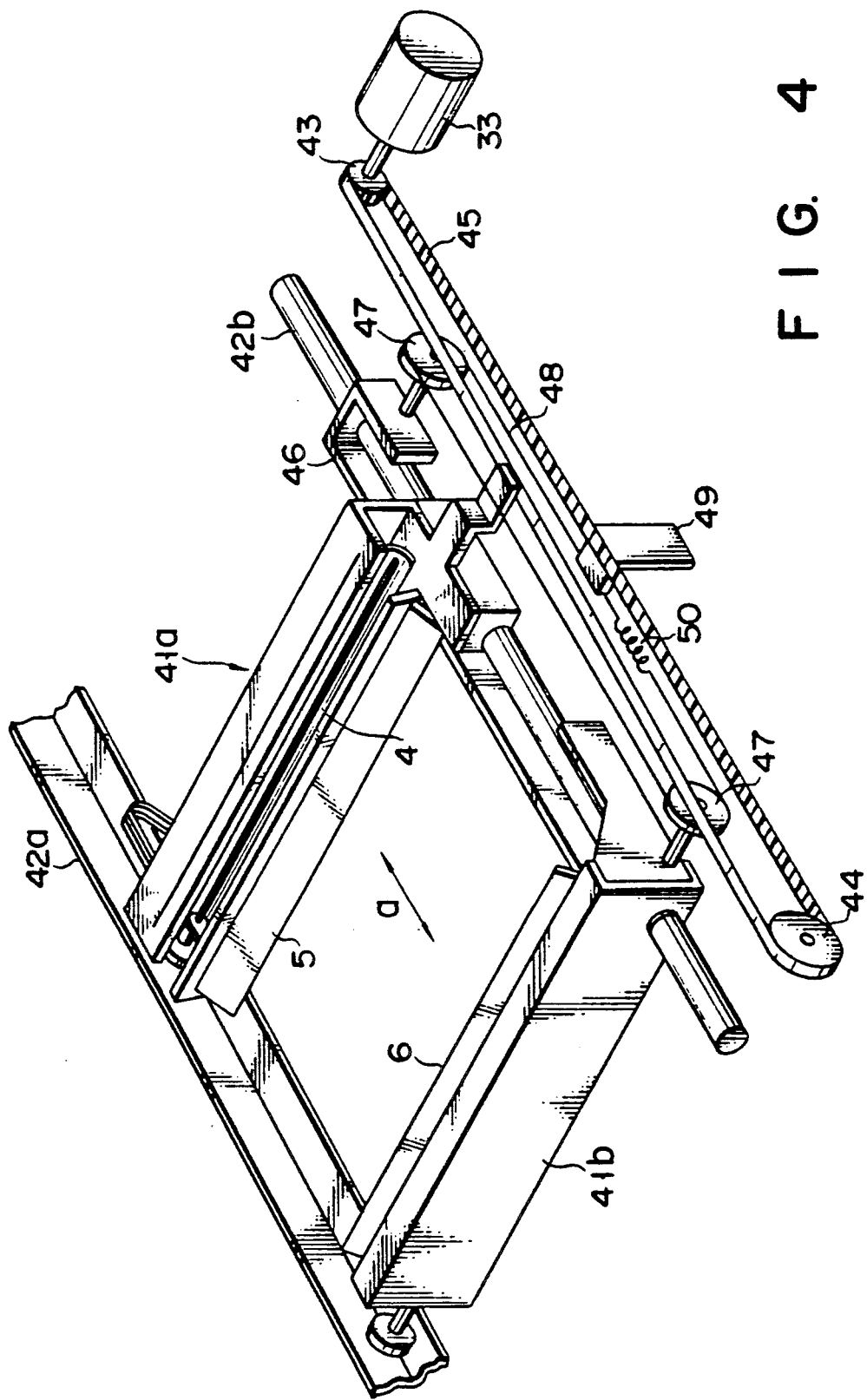
FIG. 4 is a perspective view showing the construction of a scanner.

FIG. 4 is a perspective view of a driving mechanism for moving the optical system back and forth. Referring to FIG. 4, the mirror 5 and exposure lamp 4 are supported by a first carriage 41a, and the mirrors 6 and 7 are supported by a second carriage 41b. While being guided by guide rails 42a and 42b, the first and second carriages 41a and 41b can be moved in the directions indicated by arrow a, with their parallel relationship maintained. A stepping motor 33 (i.e., a scan motor) drives a pulley 43. An endless belt 45 is provided between the pulley 43 and an idler pulley 44. The first carriage 41a is fixed, at one end, to an intermediate point of the endless belt 45.

The second carriage 41b, which supports the mirrors 6 and 7, is provided with a guide portion 46. A pair of swingable pulleys 47, 47 are provided for this guide portion 46 such that they are spaced apart from each other in the axial direction of the rail 42b. A wire 48 is wound around both pulleys 47, 47. One end of the wire 48 is connected directly to a fixed member 49, while the other end thereof is connected to the same fixed member 49 through a coil spring 50. The first carriage 41a is fixed, at one end, to an intermediate point of the wire 48. With this construction, when the scan motor 33 rotates, the belt 45 is driven, thus moving the first carriage 41a and ultimately moving the second carriage 41b. Since the pulleys 47, 47 function as movable pulleys at this time, the second carriage 41b moves in the same direction as the first carriage 41a but at the speed half that of the first carriage 41a. The moving direction of the first and second carriages 41a and 41b can be changed by reversing the rotation of the scan motor 33.

Figure 5:
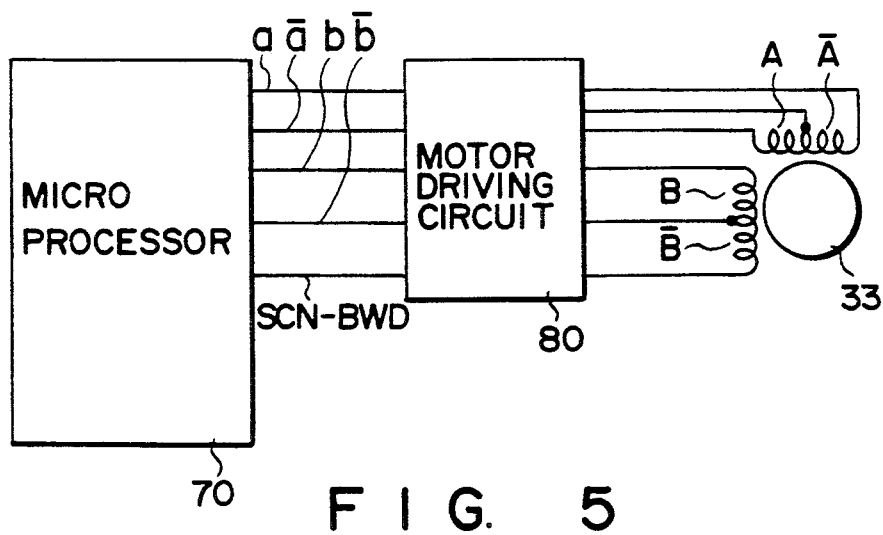
FIG. 5 is a view showing the main portion of a control system.

FIG. 5 is a view schematically showing an arrangement of the main portion of a control system. In FIG. 5, reference numeral 70 denotes a microprocessor which controls the main body of the copying apparatus as a whole. This microprocessor 70 receives key input signals from the operation panel 30 and detection signals produced by the cassette size-detecting switches 60a and 60b. In response to these signals, the microprocessor 70 outputs display control signals to be supplied to the operation panel 30, and various kinds of driving signals used for driving the photosensitive drum 10, the dischargers 11, 26, the chargers 20, 21, the developer 12, the exposure lamp 4, etc. The microprocessor 70 also outputs various kinds of control signals to be supplied to a motor driving circuit 80, by which the scan motor 33 is driven to advance and retreat the optical system. On the basis of the control signal supplied from the microprocessor 7 to the motor driving circuit 80, the start, stop, acceleration, deceleration, and normal and reverse rotating directions of the scan motor 33 are controlled. Each control signal is made up of exciting signals a, $\bar{a}$, b and $\bar{b}$ which are used for exciting windings A, $\bar{A}$, B and $\bar{B}$ of the motor 33, respectively, and of a current-switching signal (i.e., an SCN-BWD signal) which switches currents to be supplied to the windings A, $\bar{A}$, B and $\bar{B}$. When the exciting signals a, $\bar{a}$, b and $\bar{b}$ are high (H) in level, the windings A, $\bar{A}$, B and $\bar{B}$ of the scan motor 33 are excited, respectively. When the SCN-BWD signal is low (L) in level, current supplied to the windings A, $\bar{A}$, B, and $\bar{B}$ is increased.

Figure 6:
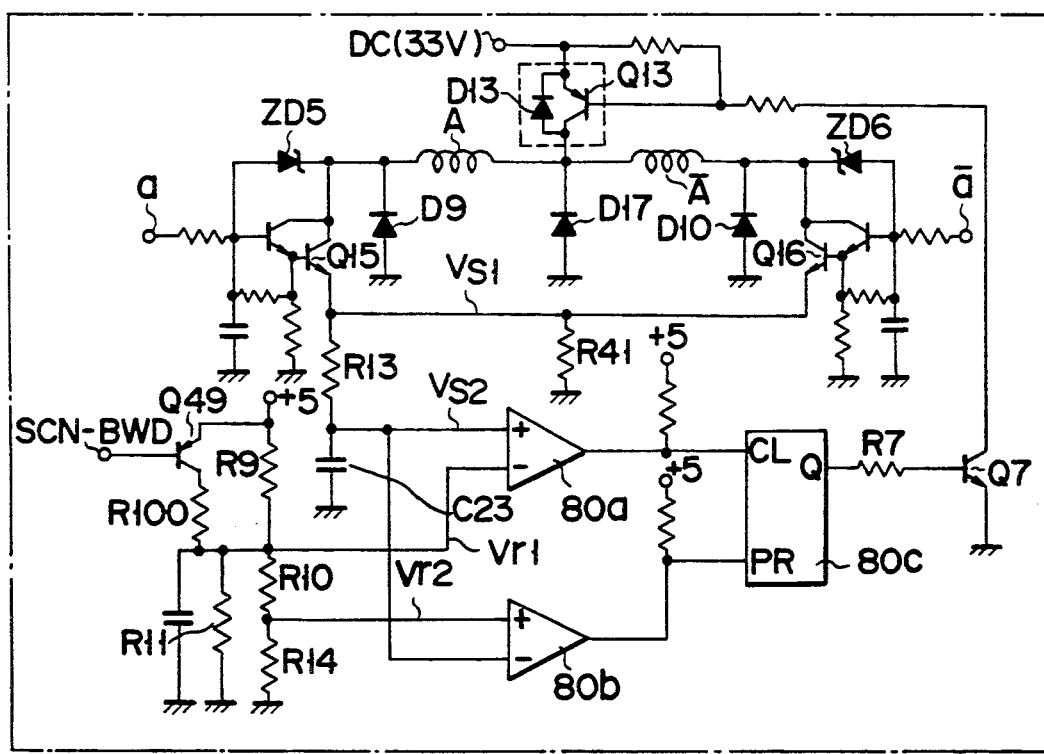
FIG. 6 is a circuit diagram schematically showing the circuit arrangement of a motor driving circuit.

FIG. 6 is a circuit diagram showing an arrangement of a motor-driving circuit 80. Since the circuit arrangement for the A and $\bar{A}$ phases is similar to that for the B and $\bar{B}$ phases, a description will be given only of the circuit arrangement for the A and $\bar{A}$ phases. When the A phase is in the excited state (i.e., when the exciting signal a is H in level), a current is produced from a non-stabilized power source DC of +33 V. This current flows through transistor Q13, winding A, transistor Q15, and resistor R41. At the time, voltage Vs1, which varies in proportion to the current flowing through winding A, is applied across resistor R41. Voltage Vs1 is smoothed by a resistor R13 and a capacitor C23 to thereby obtain a voltage Vs2, and this voltage Vs2 is supplied to both comparators 80a and 80b. In the comparator 80a, the voltage Vs2 is compared with the reference voltage Vr1; likewise, in the comparator 80b, the voltage Vs2 is compared with the reference voltage Vr2. Since the resistance of a resistor R10 is equal to that of a resistor R14 (R10=R14), the relationship between the voltages Vr1 and Vr2 is Vr1=2Vr2.

When the voltage Vs2 is lower than the voltage Vr2 (Vs2<Vr2), the output terminal of the comparator 80a is L in level, while the output terminal of the comparator 80b is H in level. A flip-flop circuit (TC4013BP) 80c is preset by these signals and produces an output Q which is H in level. Since, therefore, transistors Q7 and Q13 are turned on, the current flowing through the winding A gradually increases. In other words, both voltages Vs1 and Vs2 gradually increase.

When the voltage Vs2 is higher than the voltage Vr2 but is lower than the voltage Vr1 (Vr2<Vs2<Vr1), the output signals of the comparators 80a and 80b are both L in level. Therefore, the state of the flip-flop circuit 80c is maintained.

When the voltage Vs2 further increases and becomes higher than the voltage Vr1 (Vr1<Vs2), the output terminal of the comparator 80a is H in level, while the output terminal of the comparator 80b is L in level. Therefore, the flip-flop circuit 80c is cleared, and its output Q becomes L in level. Since, therefore, the transistors Q7 and Q13 are turned off, the current path made up of transistor Q13, winding A, transistor Q15 and resistor R41 is cut off.

In the case where the windings A and $\bar{A}$ are wound on the same core, the magnetic field generated by the current flowing through the winding A acts equally on the windings A and $\bar{A}$. Therefore, even after the transistor Q13 is turned off, a current continues to flow 10 while passing through diode D10, winding A, winding $\bar{A}$, transistor Q15, and resistor R41. Since the windings A and $\bar{A}$ are connected in series with each other, the number of turns through which the current flows at the time is twice as large as the number of turns through which a current flows when only the winding A is excited. As a result, the current is reduced to half in comparison with the current flowing immediately before the transistor Q13 is turned off. A predetermined time after this current reduction, the voltage Vs2 is reduced to half by the resistor 13 and the capacitor 23 in comparison with the voltage applied immediately before the transistor Q13 is turned off. Since, as mentioned above, the relationship between the voltages Vr1 and Vr2 is Vr1=2Vr2, the voltage Vs2 becomes lower than the voltage Vr2 (Vs2<Vr2). As a result, the transistors Q7 and Q13 are turned on again. Thereafter, the operation mentioned above is repeated.

When the excitation is switched to bring the $\bar{A}$ phase into the excited state (i.e., when the exciting signal $\bar{a}$ is H in level), the transistor Q15 is turned off and the transistor Q16 is turned on. Since no current flows through the winding A when the transistor Q15 is off, a current, which is substantially equal to the current that flows through the winding A immediately before the transistor Q15 is turned off, flows to the $\bar{A}$ phase, while passing through diode D10, winding $\bar{A}$ and diode D13. After the current flowing like this reduces to zero, a current flows through transistor Q13, winding $\bar{A}$, transistor Q16 and resistor R41. Accordingly, the $\bar{A}$ phase is excited.

Figure 7:
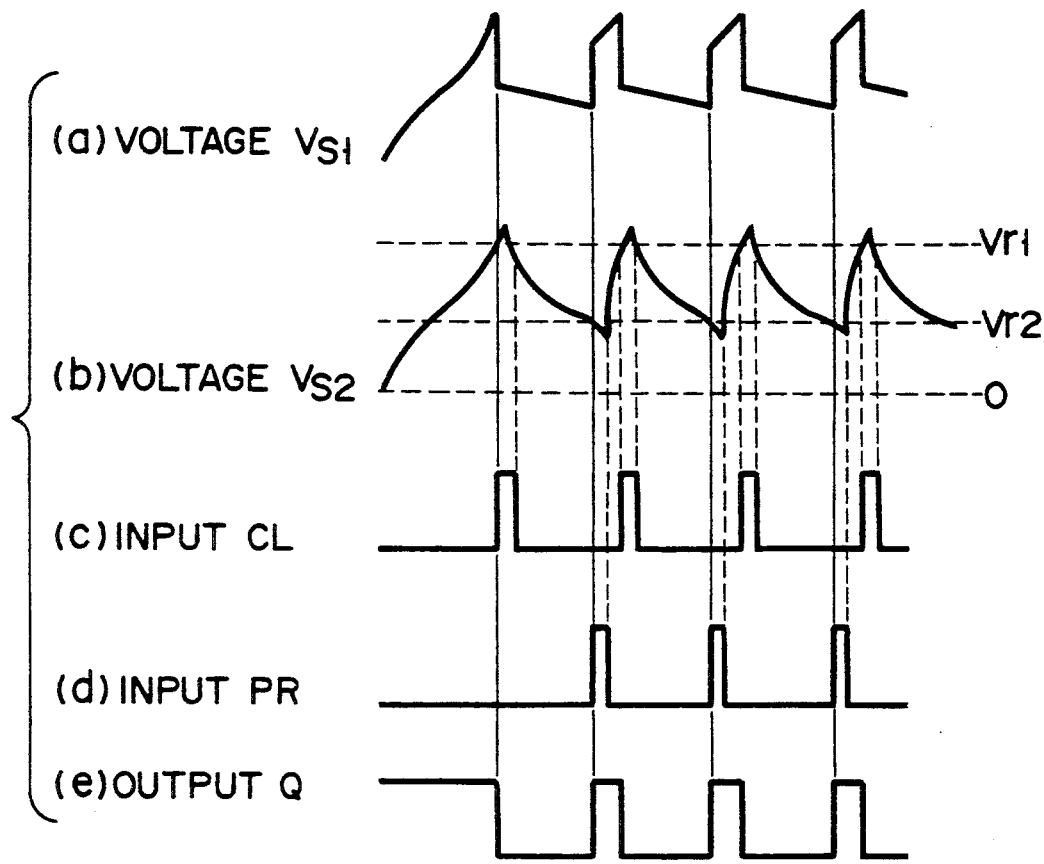
FIG. 7 is a waveform chart concerning the motor driving circuit.

FIG. 7 is a waveform chart showing the waveforms of the voltages Vs1 and Vs2, inputs CL (clear) and PR (preset) to the flip-flop circuit 80c, and an output Q of the flip-flop circuit 80c. As may be understood from FIG. 7, when the voltage Vs2 becomes lower than the voltage Vr2, the flip-flop circuit 80c is preset, thus causing its output Q to be H in level. When the voltage Vs2 becomes higher than the voltage Vr1, the flip-flop circuit 80c is cleared, thus causing its output Q to be L in level. It should be noted that torque varies in proportion to the product of the value of current and the number of turns. Therefore, when a current flows along the path made up of diode D10, winding $\bar{A}$, winding A, transistor Q15 and resistor R41, the torque is maintained at a constant value even if the current is reduced to $\frac{1}{2}$.

When an original is being scanned, it is not necessary to produce torque which is as large as that required when the scanning optical system is being returned. Therefore, the current is reduced during the scanning operation, so as to prevent the scan motor 33 and the motor-driving circuit 80 from producing much heat. More specifically, the level of the SCN-BWD signal is set to be H during the scanning operation, to thereby turn off the transistor Q49. Conversely, the level of the SCN-BWD signal is set to be L during the returning operation, to thereby turn on the transistor Q49. Accordingly, the reference voltages Vr1 and Vr2 used during the returning operation become higher than those used during the scanning operation. Therefore, a larger amount of current flows during the returning operation than during the scanning operation.

Figure 8:
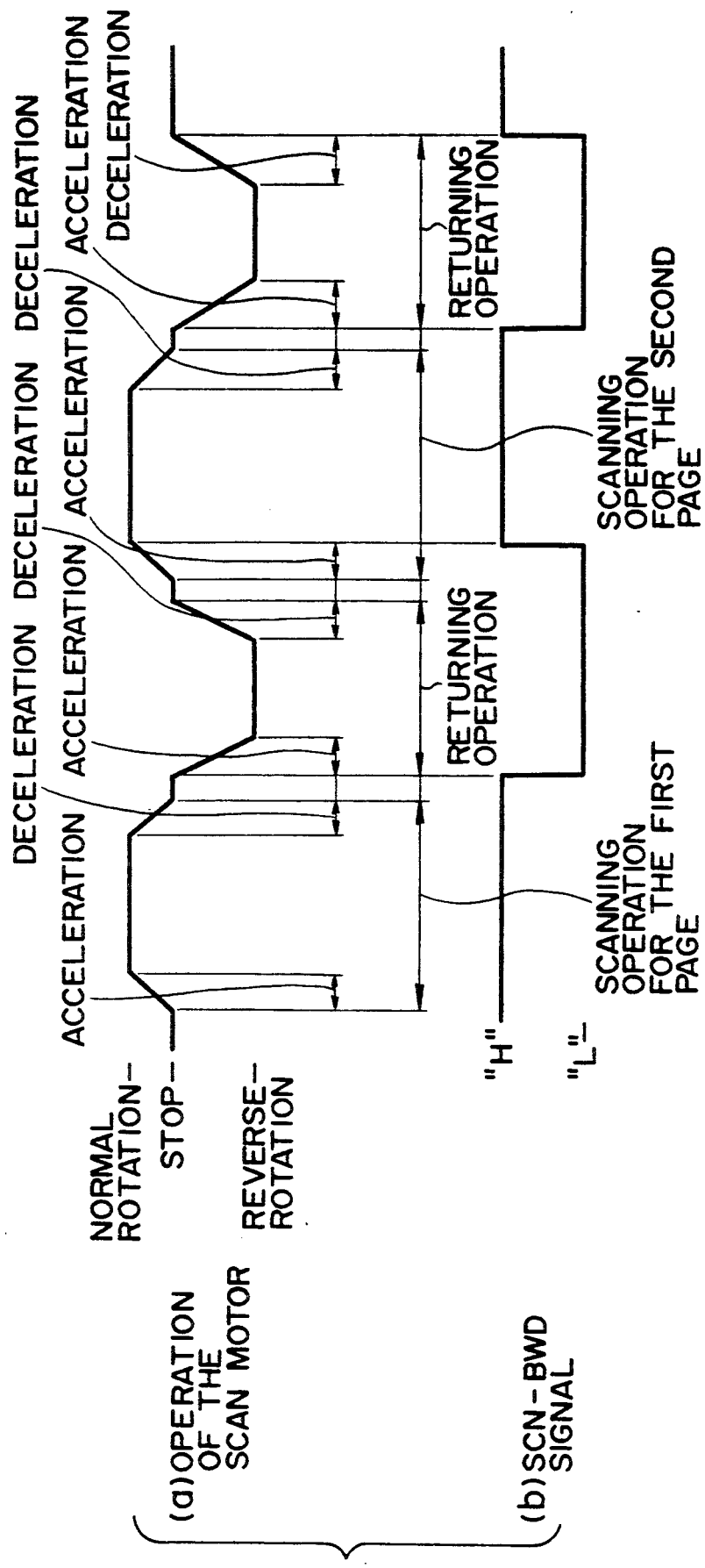
FIG. 8 is a timing chart for explaining the operation of an original scanning apparatus according to the present invention.

Next, a description will be given of the timing at which the SCN-BWD signal is switched, with reference to FIG. 8. Let it be assumed that an original has a plurality of pages and that these pages are to be read in succession. When the first page of the original is scanned, the SCN-BWD signal is set to be H in level from the beginning of the acceleration of the optical system (the acceleration being carried out by rotating the scan motor 33 in the normal direction). After the scanning operation for the first page of the original is completed, the SCN-BWD signal is set to be L in level in synchronism with the start of the returning operation of the optical system (the returning operation of the optical system being carried out by rotating the scan motor 33 in the reverse direction).

After the optical system has been returned to the initial position, the level of the SCN-BWD signal is changed from L to H in synchronism with the end of the acceleration performed for the scanning of the second page of the document. The level of the SCN-BWD signal is changed again to L in synchronism with the start of the next returning operation. If the page to be scanned is the last one of the original, then the level of the SCN-BWD signal is changed to H at the end of the returning operation.

As mentioned above the L level of the SCN-BWD signal is maintained not only during the returning operation but also during the interval from the start of the returning operation to the end of the acceleration performed for the next scanning operation. In this manner, the amount of current flowing through the windings of the scan motor is made larger during the above interval than during the scanning operation. As a result, large torque is produced from the scan motor 33 as long as the SCN-BWD signal is of the L level. Even if the optical system is suddenly decelerated at the end of the returning operation and is then immediately accelerated for the next scanning operation, the rotor of the scan motor is prevented from being shifted from the right position at the end of the returning operation, due to the supply of a large amount of current. Thus, vibration is suppressed. Since this vibration is suppressed, the scan motor is prevented from becoming out of step, and the rotor and stator of the scan motor are prevented from being shifted in position, thus preventing dislocation of the scanning optical system. Accordingly, an image produced by the image-forming apparatus is prevented from being blurred.

The above embodiment was explained, referring to the case where a scanner is provided for an electronic copying machine. However, the present invention is not limited to this, and is applicable also to a document-scanning device itself, e.g., a document reader. Moreover, the present invention is applicable not only to an electronic copying machine but also to various types of image-forming apparatuses incorporating a scanner.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An original scanning apparatus, comprising:
   means for scanning an original supported by a supporting member;
   a step motor energized by an exciting current, for moving to advance and return said scanning means;
   means for driving said step motor by supplying an exciting current to said step motor; and
   means for controlling said driving means such that the torque of said motor is increased by increasing said exciting current during an interval from a start of a movement in a first direction of said scanning means to an end of an acceleration movement in a second direction opposite to said first direction of said scanning means.

2. An original scanning apparatus according to claim 1, wherein said movement in said first direction corresponds to a returning operating of said scanning means.

3. An original scanning apparatus, comprising:
   means for scanning an original supported by a supporting member;
   a step motor energized by an exciting current for moving to advance and return said scanning means;
   means for driving said step motor by supplying said exciting current to said step motor, wherein said driving means includes,
   a scan excitation circuit for permitting said motor to advance for a scanning operation;
   a return excitation circuit for permitting said motor to return;
   a scan/return switching means, connected to both said scan excitation circuit and said return excitation circuit, for switching said motor between said scanning operation and said returning operation in response to a control signal supplied from said control means; and
   means for controlling said driving means such that the torque of said step motor is increased by increasing said exciting current during an interval from a start of a movement in a first direction of said scanning means to an end of an acceleration movement in a second direction opposite to said first direction of said scanning means.

4. An original scanning apparatus, comprising:
   means for scanning an original supported by a supporting means;
   a step motor energized by an exciting current, for moving to advance and return said scanning means;
   means for driving said motor by supplying said exciting current to said step motor; and
   means for increasing a driving current supplied from said driving means to said step motor during an interval from a start of a movement in a first direction of said scanning means to an end of an acceleration movement in a second direction opposite to said first direction of said scanning means.

5. An original scanning apparatus according to claim 4, wherein said scanning means is stopped between said first direction and said second direction.

6. An image forming apparatus, comprising:
   means for scanning an original supported by a supporting means;
   a step motor energized by an exciting current, for moving to advance and return said scanning means;
   means for driving said step motor by supplying said exciting current to said step motor;
   means for controlling said driving means such that the torque of said step motor is increased by increasing said exciting current during an interval from a start of a movement in a first direction of said scanning means to an end of an acceleration movement in a second direction opposite to said first direction of said scanning means; and
   means for forming an original image obtained by said scanning means onto a transfer material.

7. An image forming apparatus according to claim 6, wherein said movement in said first direction corresponds to a returning operation of said scanning means.

8. An image forming apparatus, comprising:
   means for scanning an original supported by a supporting means;

a step motor energized by an exciting current, for moving to advance and return said scanning means;

means for driving said step motor by supplying said exciting current to said step motor, said driving means including:

a scan excitation circuit for permitting said motor to advance for a scanning operation;

a return excitation circuit for permitting said motor to return;

a scan/return switching means, connected to both said scan excitation circuit and said return excitation circuit, for switching said motor between said scanning operation and said returning operation in response to a control signal supplied from said control means; and means for controlling said driving means such that the torque of said motor is increased by increasing said exciting current during an interval from a start of a movement in a first direction of said scanning means to an end of an acceleration movement in a second direction opposite to said first direction of said scanning means; and means for forming an original image obtained by said scanning means onto a transfer material.

9. An image forming apparatus, comprising:

means for scanning an original supported by a supporting means;

a step motor energized by an exciting current, for moving to advance and return said scanning means;

means for driving said motor by supplying an exciting current to said step motor;

means for increasing a driving current supplied from said driving means to said step motor during an interval from a start of a movement in a first direction of said scanning means to an end of an acceleration movement in a second direction opposite to said first direction of said scanning means; and means for forming an original image obtained by said scanning means onto a transfer material.

10. An image forming apparatus according to claim 9, wherein said scanning means is stopped between said first direction and said second direction.

* * * * *